(12) United States Patent
Low

(10) Patent No.: US 12,503,632 B2
(45) Date of Patent: *Dec. 23, 2025

(54) REFRIGERANT COMPOSITIONS AND USES THEREOF

(71) Applicant: Mexichem Fluor S.A. de C.V., San Luis Potosi (MX)

(72) Inventor: Robert Low, Runcorn (GB)

(73) Assignee: Mexichem Fluor S.A. de C.V., San Luis Potosi (MX)

( * ) Notice: Subject to any disclaimer, the term of this patent is extended or adjusted under 35 U.S.C. 154(b) by 728 days.

This patent is subject to a terminal disclaimer.

(21) Appl. No.: 17/878,283

(22) Filed: Aug. 1, 2022

(65) Prior Publication Data

US 2023/0073051 A1 Mar. 9, 2023

Related U.S. Application Data

(63) Continuation of application No. 16/614,151, filed as application No. PCT/GB2018/051344 on May 17, 2018, now Pat. No. 11,447,674.

(30) Foreign Application Priority Data

May 17, 2017 (GB) ...................................... 1707909

(51) Int. Cl.
```
C09K 5/04      (2006.01)
A62D 1/00      (2006.01)
B01D 11/02     (2006.01)
B01D 11/04     (2006.01)
C11D 7/50      (2006.01)
G06Q 50/26     (2024.01)
```

(52) U.S. Cl.
CPC ............ C09K 5/045 (2013.01); A62D 1/0057 (2013.01); B01D 11/0288 (2013.01); B01D 11/0492 (2013.01); C09K 5/041 (2013.01); C11D 7/5077 (2013.01); C11D 7/509 (2013.01); G06Q 50/26 (2013.01); *C09K 2205/106* (2013.01); *C09K 2205/12* (2013.01); *C09K 2205/122* (2013.01); *C09K 2205/126* (2013.01); *C09K 2205/22* (2013.01); *C09K 2205/32* (2013.01)

(58) Field of Classification Search
CPC ...................................................... C09K 5/045
See application file for complete search history.

(56) References Cited

U.S. PATENT DOCUMENTS

| | | | |
|---|---|---|---|
| 11,447,674 B2* | 9/2022 | Low ................... | B01D 11/0288 |
| 2013/0153817 A1 | 6/2013 | Singh et al. | |
| 2018/0002586 A1 | 1/2018 | Low et al. | |

FOREIGN PATENT DOCUMENTS

| | | |
|---|---|---|
| EP | 3029395 | 6/2016 |
| GB | 2516694 | 2/2015 |
| WO | WO 2014/134821 | 9/2014 |
| WO | WO 2016/120645 | 8/2016 |

OTHER PUBLICATIONS

D.R. Burgess, Jr., et al.; Thermochemical and Chemical Kinetic Data for Fluorinated Hydrocarbons; Prog. Energy Combust. Sci. vol. 21, pp. 453-529, 1996, Published by Elsevier Science Ltd, Printed in Great Britain; 77 pp.
Dahmen, Nicolaus, et al.; Phase separation in binary mixtures of trifluoromethane with propane, butane and xenon at low temperatures between 200 and 280 K, and at pressures up to 200 MPa; Fluid Phase Equilibria, vol. 87, Issue 2, Aug. 2, 1993, pp. 295-308; 2 pp.
DeRuiter, Jack; Principles of Drug Action 1, Spring 2005, Alkenes; Hydrocarbon Structure and Chemistry: Alkenes, 10 pp.
Edited by Uddin, Jamal; Macro to Nano Spectroscopy, Published by InTech; Copyright 2012 InTech; ISBN 978-953-51-0664-7; 28 pp.
International Search Report for corresponding International Application No. PCT/TG2018/051344 dated Aug. 16, 2018.
Written Opinion for corresponding International Application No. PCT/TG2018/051344 dated Aug. 16, 2018.

\* cited by examiner

Primary Examiner — Peter F Godenschwager
(74) Attorney, Agent, or Firm — Crowell & Moring LLP

(57) ABSTRACT

A composition comprising: (i) 1,1-difluoroethene (vinylidene fluoride, R-1132a); (ii) carbon dioxide ($CO_2$, R-744); (iii) pentafluoroethane (R-125); and (iv) one or more of trifluoromethane (R-23) and hexafluoroethane (R-116).

29 Claims, No Drawings

REFRIGERANT COMPOSITIONS AND USES THEREOF

CROSS-REFERENCE TO RELATED APPLICATIONS

This application is a continuation of U.S. application Ser. No. 16/614,151, filed Nov. 15, 2019, which is the U.S. national stage application of PCT application no. PCT/GB2018/051344, filed on May 17, 2018, which claims priority to Great Britain application no. 1707909.6, filed on May 17, 2017, the contents of which are each incorporated herein by reference in their entirety.

The invention relates to compositions, preferably to heat transfer compositions, and in particular to ultra-low temperature heat transfer compositions which may be suitable as replacements for existing refrigerants such as R-23, R-1361, R-508A or R-508B.

The listing or discussion of a prior-published document or any background in the specification should not necessarily be taken as an acknowledgement that a document or background is part of the state of the art or is common general knowledge.

Mechanical refrigeration systems and related heat transfer devices such as heat pumps and air-conditioning systems are well known. In such systems, a refrigerant liquid evaporates at low pressure taking heat from the surrounding zone. The resulting vapour is then compressed and passed to a condenser where it condenses and gives off heat to a second zone, the condensate being returned through an expansion valve to the evaporator, so completing the cycle. Mechanical energy required for compressing the vapour and pumping the liquid is provided by, for example, an electric motor or an internal combustion engine.

"Blast freezer" equipment is used for rapid freezing of food or pharmaceutical products by contact of the product to be frozen inside a closed compartment with recirculating low-temperature air.

Conventional blast freezing for food uses a single stage refrigeration system, to generate rapid cooling down to temperatures between about −18 and about −30° C. A typical refrigerant used for this would be R-404A (by weight 44% pentafluoroethane (R-125), 52% 1,1,1-trifluoroethane (R-143a) and 4% 1,1,1,2-tetrafluoroethane (R-134a)).

It has been found that using a lower cooling temperature can allow sea transport of high value seafood (e.g. sea urchin, swordfish, tuna) over long distances. Several shipping companies offer refrigerated transport container systems ('reefers') capable of maintaining temperatures of about −60° C. In these cascade systems a low temperature refrigeration loop using trifluoromethane (R-23) cools the container air to −60° C. then rejects its heat to a second higher temperature refrigeration loop (using R-134a or R-404A). The high temperature stage rejects the heat to ambient air. These systems work well but the GWP of R-23 is very high at 14,800. It would therefore be desirable to have a low-flammability or non-flammable fluid of lower GWP capable of replacing R-23 in this application.

The pharmaceutical industry also uses blast freezing at low temperatures to freeze and preserve active ingredients and other biologically derived materials, as discussed in the reference monograph "*Freeze-Drying/Lyophilization of Pharmaceutical and Biological Products, Third Edition*" edited by Louis Rey published by CRC Press, 19 Apr. 2016, incorporated by reference herein. Specific examples include, but are not limited to, insulin, vaccines and tissue samples. Traditional refrigerants used in these systems include bromotrifluoromethane (R-1361), R-23, R-508A (39% R-23, 61% R-116) and R-508B (46% R-23, 56% R-116), where the operating temperatures range from about −60° C. to about −90° C.

There are several refrigerant and application characteristics that need to be considered in developing feasible alternatives for R-23 (and other low-temperature refrigerants used in cascade systems), including:
Low flammability
Suitable operating temperature
An operating pressure similar to that of R-23
Performance as a refrigerant (e.g. cooling capacity and energy efficiency)
Minimal temperature glide of refrigerant
Low Global Warming Potential (GWP)

The design of a suitable refrigerant therefore involves making multiple informed selections of composition and component to reach a feasible alternative.

One way of assessing non-flammability is to apply the flammability analysis methodology stipulated by ASHRAE Standard 34:2016, which prescribes a range of leakage scenarios that should be applied to refrigerant blends to identify the potentially flammable worst-case compositions.

If the fluid is to be used as a retrofit or conversion fluid in existing equipment, or as a "drop-in" to new equipment (e.g. using an essentially unchanged R-23 system design), then non-flammability is highly desired, as the existing design will have been based on the use of non-flammable fluid. In particular, for larger systems and marine transport (reefer) applications, non-flammability in all circumstances (including leakage) is highly preferred.

It is also advantageous to have acceptably low toxicity as a characteristic of the fluid.

The volumetric capacity (a measure of the cooling power achievable by a given size of compressor) and energy efficiency are important considerations for any composition with heat transfer properties. This is especially so in cascade operation as any inefficiency in the low temperature stage also increases power consumption of the compressor in the top stage of the cascade.

R-170 (ethane) has very low GWP, acceptable refrigeration performance and low toxicity but its high flammability limits its application. For instance, safety regulations can restrict the maximum charge quantity of refrigerant in appliances.

R-744 (carbon dioxide) is non-flammable but cannot be used alone in the bottom stage of low temperature cascade systems because the operating temperatures are below the triple point of R-744, which is −56.7° C. This means that solid carbon dioxide (dry-ice) could form in low pressure sections of the system, leading to blockages, poor control and inefficient operation.

R-1132a (1,1-difluoroethene, also known as vinylidene fluoride) also has low GWP and acceptable toxicity. The flammability of R-1132a is reduced compared to ethane but it is still in ASHRAE flammability class 2 ("moderately flammable"). The thermodynamic energy efficiency of pure R-1132a is close to that of R-508 and better than that of R-23 but its refrigeration capacity is reduced compared to R-508 and R-23.

Thus, there is a need to provide alternative refrigerants having improved properties such as low GWP, yet possessing acceptable refrigeration performance, flammability characteristics and toxicology. There is also a need to provide alternative refrigerants that may be used in existing devices such as refrigeration devices with little or no modification.

The subject invention addresses the above and other deficiencies by the provision of a composition comprising: 1,1-difluoroethene (vinylidene fluoride, R-1132a); carbon dioxide ($CO_2$, R-744); pentafluoroethane (R-125); and one or more of trifluoromethane (R-23) and hexafluoroethane (R-116).

The invention also provides the use of the compositions of the invention as refrigerants, preferably low temperature refrigerants suitable for use in blast freezing equipment. The temperatures reached by using the compositions of the invention as refrigerants may be −60° C. or below, such as −70° C. or below, preferably −80° C. or below, or even −90° C. or below.

Surprisingly, it has been found that the compositions of the invention exhibit a combination of suitable flammability properties, a similar operating pressure to R-23, comparable or superior refrigeration performance to R-23, desirable temperature glide and low GWP.

The compositions of the invention may comprise from about 1 to about 90% by weight R-1132a, such as from about 1 to about 80% by weight, from about 1 to about 70% by weight or from about 1 to about 60% by weight. Preferably, the compositions comprise from about 1 to about 50% by weight R-1132a, such as from about 5 to about 45% by weight, from about 10 to about 45% by weight, from about 15 to about 40% by weight. Advantageously, the compositions may comprise from about 20 to about 40% by weight R-1132a, preferably from about 25 to about 35% by weight R-1132a.

The compositions of the invention may comprise from about 1 to about 90% by weight carbon dioxide, such as from about 1 to about 80% by weight, from about 5 to about 70% by weight or from about 10 to about 60% by weight. Preferably, the compositions comprise from about 25 to about 60% by weight carbon dioxide, such as from about 30 to about 55% by weight, or even more preferably, from about 35 to about 50% by weight.

The compositions of the invention are surprisingly able to operate below −56.7° C. (the triple point of carbon dioxide) without the formation of dry ice in the system.

The compositions of the invention may comprise from about 1 to about 90% by weight R-125, such as from about 1 to about 80% by weight, from about 1 to about 70% by weight or from about 1 to about 60% by weight. Preferably, the compositions comprise from about 1 to about 50% by weight, such as from about 5 to about 45% by weight, from about 5 to about 30% by weight, or even from about 10 to about 25% by weight.

The compositions of the invention may comprise from about 1 to about 90% by weight of the fourth component, such as from about 1 to about 80% by weight, from about 1 to about 70% by weight or from about 1 to about 60% by weight. Preferably, the compositions of the invention can comprise from about 1 to about 50% by weight of the fourth component.

In an embodiment, the fourth component comprises or is R-23. Thus, a preferred composition of the invention comprises R-1132a, $CO_2$, R-125 and R-23.

In a preferred embodiment, there is provided a composition comprising from about 20 to about 40% by weight R-1132a, from about 30 to about 60% by weight carbon dioxide, from about 1 to about 20% by weight R-23 and from about 1 to about 35% by weight R-125.

Advantageously, there is provided a composition comprising from about 25 to about 35% by weight R-1132a, from about 35 to about 50% by weight carbon dioxide, from about 5 to about 15% by weight R-23 and from about 5 to about 30% by weight R-125.

In a preferred embodiment, there is provided a composition comprising from about 25 to about 30% by weight R-1132a, from about 35 to about 50% by weight carbon dioxide, from about 10 to about 25% by weight R-125 and from about 5 to about 20% by weight R-23.

In an alternative embodiment, the fourth component comprises or is R-116. Thus, a preferred composition of the invention comprises R-1132a, $CO_2$, R-125 and R-116.

In a preferred embodiment, there is provided a composition comprising from about 30 to about 60% by weight carbon dioxide, from about 10 to about 40% by weight R-1132a, from about 5 to about 30% by weight R-125 and from about 1 to about 20% by weight R-116.

A preferred composition of the invention comprises from about 35 to about 55% by weight carbon dioxide, from about 15 to about 35% by weight R-1132a, from about 10 to about 30% by weight R-125 and from about 1 to about 15% by weight R-116.

Advantageously, there is provided a composition comprising from about 25 to about 35% by weight R-1132a (e.g. about 30%), from about 40 to about 50% by weight carbon dioxide (e.g. about 45%), from about 15 to about 25% by weight R-125 (e.g. about 20%) and from about 1 to about 15% by weight R-116 (e.g. about 5%).

Preferably, the R-1132a is present in an amount of less than 50% by mol. The ASHRAE fractionation analysis referred to above requires an assessment of liquid and vapour compositions during vapour leakage from a cylinder and should be conducted for two levels of refrigerant charge (15% and 90% of maximum fill) and over a range of temperatures from −40° C. to +60° C. A composition comprising less than 50% by mol. of R-1132a, preferably less than 30% by mol., will result in a weakly flammable or, preferably, a non-flammable composition under fractionation analysis.

The ASHRAE fractionation analysis is conservative in nature. The blends of the invention, like R-23, typically will have critical temperatures close to ambient temperature. This means that if the system is not operational, and warms to ambient temperature, then it is possible that the blend could be above its critical temperature. In this case, it will exist as a homogenous supercritical fluid. Leakage would therefore be of the bulk composition, not of a fractionated vapour. Therefore, if the bulk fluid is non-flammable the composition could be used for various applications without a significant risk of generating a flammable atmosphere.

In an embodiment, the compositions may consist essentially of the stated components.

By the term "consist essentially of", we mean that the compositions of the invention contain substantially no other components, particularly no further (hydro)(fluoro) compounds (e.g. (hydro)(fluoro)alkanes or (hydro)(fluoro)alkenes) known to be used in heat transfer compositions. The term "consist of" is included within the meaning of "consist essentially of".

In an embodiment, the compositions of the invention are substantially free of any component that has heat transfer properties (other than the components specified). For instance, the compositions of the invention may be substantially free of any other hydrofluorocarbon compound.

By "substantially no" and "substantially free of", we include the meaning that the compositions of the invention contain 0.5% by weight or less of the stated component, preferably 0.1% or less, based on the total weight of the composition.

The compositions of the invention may be azeotropic or near azeotropic, preferably azeotropic.

By azeotropic composition, we include the meaning of a composition which at vapour-liquid equilibrium has the same composition in both phases, and whose boiling point is lower than that of the pure components. All the azeotropic compositions of the invention have been found to exhibit a positive deviation from ideality. By near-azeotropic composition we include the meaning of liquid compositions whose vapour pressure is above that of the pure component with the lower boiling point when measured at equivalent temperature, but whose equilibrium vapour composition may differ from the liquid composition.

All of the chemicals herein described are commercially available. For example, the fluorochemicals may be obtained from Apollo Scientific (UK) and carbon dioxide may be obtained from liquefied gas suppliers such as Linde AG.

As used herein, all percentage amounts mentioned in compositions herein, including in the claims, are by weight based on the total weight of the compositions, unless otherwise stated.

By the term "about", as used in connection with numerical values of amounts of components in % by weight, we include the meaning of ±0.5% by weight, for example ±0.2% by weight or ±0.1% by weight.

For the avoidance of doubt, it is to be understood that the stated upper and lower values for ranges of amounts of components in the compositions of the invention described herein may be interchanged in any way, provided that the resulting ranges fall within the broadest scope of the invention.

The compositions of the invention have zero ozone depletion potential.

The GWP is desired to be as low as possible whilst respecting the other constraints on flammability, performance and operational temperature range The compositions have a GWP of less than 7400, such as less than 5000, less than 4000 or preferably less than 3700. The compositions advantageously have a GWP of less than 3000, less than 2500, less than 2000, less than 1500 or even less than 1000.

Typically, the compositions of the subject invention are of reduced flammability hazard when compared to R-1132a.

Flammability may be determined in accordance with ASHRAE Standard 34:2016 incorporating the ASTM Standard E-681 with test methodology as per Addendum 34p dated 2004, the entire content of which is incorporated herein by reference.

In some embodiments, the compositions have one or more of (a) a higher lower flammable limit; (b) a higher ignition energy (sometimes referred to as auto ignition energy or pyrolysis); or (c) a lower flame velocity compared to R-1132a alone. Preferably, the compositions of the invention are less flammable compared to R-1132a in one or more of the following respects: lower flammable limit at 23° C.; lower flammable limit at 60° C.; breadth of flammable range at 23° C. or 60° C.; auto-ignition temperature (thermal decomposition temperature); minimum ignition energy in dry air or flame speed. The flammable limits being determined according to the methods specified in ASHRAE Standard 34:2016 and the auto-ignition temperature being determined in a 500 ml glass flask by the method of ASTM E659-78.

In a preferred embodiment, the compositions of the invention are non-flammable. For example, the compositions of the invention are non-flammable at a test temperature of 60° C. using the ASHRAE methodology. Advantageously, the mixtures of vapour that exist in equilibrium with the compositions of the invention at any temperature between about −40° C. and 60° C. are also non-flammable.

In some applications it may not be necessary for the formulation to be classed as non-flammable by the ASHRAE methodology; it is possible to develop fluids whose flammability limits will be sufficiently reduced in air to render them safe for use in the application, for example if it is physically not possible to make a flammable mixture by leaking the refrigeration equipment charge into the surrounds.

In one embodiment, the compositions of the invention have a flammability classifiable as 1 or 2L according to the ASHRAE classification method, indicating non-flammability (class 1) or a weakly flammable fluid with flame speed lower than 10 cm/s (class 2L).

Temperature glide can be managed within a system and glides of less than about 10 K are acceptable with only minor effects on performance. Glides of greater than about 10 K can cause some degradation in expected performance unless heat exchangers are designed to accommodate the glide effect.

A composition of the invention preferably have a temperature glide in an evaporator or condenser of less than about 10 K, even more preferably less than about 7 K, such as less than about 5 K (e.g. less than 3 K). "Temperature glide" is the term given to the change in temperature experienced during evaporation or condensation of a non-azeotropic refrigerant mixture.

The critical temperature of a heat transfer composition should be higher than the maximum expected condenser temperature. This is because the cycle efficiency typically drops as critical temperature is approached. As this happens, the latent heat of the refrigerant is reduced and so more of the heat rejection in the condenser takes place by cooling gaseous refrigerant; this requires more area per unit heat transferred. The critical temperature of R-508B is about 11° C. and the critical temperature of R-23 is about 26° C.

In one aspect, the compositions of the invention have a critical temperature of greater than about 0° C., preferably greater than about 10° C., more preferably greater than about 25° C.

The compositions of the invention typically have a volumetric refrigeration capacity that is at least 85% of that of R-23 at comparable cycle conditions. Preferably, the compositions of the invention have a volumetric refrigeration capacity that is at least 90% of that of R-23, for example from about 95% to about 120% (e.g. about 96% to about 115%) of that of R-23.

The compositions of the invention, in use as refrigerants, typically are capable of reaching temperatures of −60° C. or lower, preferably −70° C. or lower, for example −80° C. or lower whilst maintaining the evaporation pressure above atmospheric pressure.

In one embodiment, the cycle efficiency (Coefficient of Performance, COP) of the compositions of the invention is at least 95% and/or within about 5% of the existing refrigerant fluid it is replacing (e.g. R-23).

Conveniently, the compressor discharge temperature of the compositions of the invention is within about 15 K of the existing refrigerant fluid it is replacing, preferably about 10 K or even about 5 K.

The compositions of the invention are typically suitable for use in existing designs of equipment, for example, low temperature refrigeration equipment and are compatible with all classes of lubricant currently used with established HFC refrigerants. They may be optionally stabilised or compatibilised with mineral oils by the use of appropriate additives.

Preferably, when used in heat transfer equipment, the composition of the invention is combined with a lubricant.

Conveniently, the lubricant is selected from the group consisting of mineral oil, silicone oil, polyalkyl benzenes (PABs), polyol esters (POEs), polyalkylene glycols (PAGs), polyalkylene glycol esters (PAG esters), polyvinyl ethers (PVEs), poly (alpha-olefins) and combinations thereof. PAGs and POEs (particularly the latter) are currently preferred lubricants for the compositions of the invention.

Advantageously, the lubricant further comprises a stabiliser. The lubricant may preferably further comprise pentane (e.g. n-pentane or iso-pentane). The pentane may be present in an amount of from about 1 to about 10% by weight, such as from about 2 to about 6% by weight of the refrigerant charge (e.g. a composition containing the pentane, lubricant and heat transfer composition).

Preferably, the stabiliser is selected from the group consisting of diene-based compounds, phosphates, phenol compounds and epoxides, and mixtures thereof.

Conveniently, the composition of the invention may be combined with a flame retardant.

Advantageously, the flame retardant is selected from the group consisting of tri-(2-chloroethyl)-phosphate, (chloropropyl) phosphate, tri-(2,3-dibromopropyl)-phosphate, tri-(1,3-dichloropropyl)-phosphate, diammonium phosphate, various halogenated aromatic compounds, antimony oxide, aluminium trihydrate, polyvinyl chloride, a fluorinated iodocarbon, a fluorinated bromocarbon, trifluoro iodomethane, perfluoroalkyl amines, bromo-fluoroalkyl amines and mixtures thereof.

In one embodiment, the invention provides a heat transfer device comprising a composition of the invention.

Preferably, the heat transfer device is a refrigeration device.

Conveniently, the heat transfer device is an ultra-low temperature refrigeration system, such as a blast freezer.

Advantageously, the heat transfer device contains a cascade system.

The invention also provides the use of a composition of the invention in a heat transfer device as herein described.

According to a further aspect of the invention, there is provided a method for cooling an article which comprises condensing a composition of the invention and thereafter evaporating said composition in the vicinity of the article to be cooled.

According to another aspect of the invention, there is provided a method for heating an article which comprises condensing a composition of the invention in the vicinity of the article to be heated and thereafter evaporating said composition.

According to a further aspect of the invention, there is provided a method for extracting a substance from biomass comprising contacting the biomass with a solvent comprising a composition of the invention, and separating the substance from the solvent.

According to another aspect of the invention, there is provided a method of cleaning an article comprising contacting the article with a solvent comprising a composition of the invention.

According to a further aspect of the invention, there is provided a method for extracting a material from an aqueous solution comprising contacting the aqueous solution with a solvent comprising a composition of the invention, and separating the material from the solvent.

According to another aspect of the invention, there is provided a method for extracting a material from a particulate solid matrix comprising contacting the particulate solid matrix with a solvent comprising a composition of the invention, and separating the material from the solvent.

According to another aspect of the invention, there is provided a method of retrofitting a heat transfer device comprising the step of removing an existing heat transfer fluid, and introducing a composition of the invention. Preferably, the heat transfer device is a refrigeration device, more preferably still the device is an ultra-low temperature refrigeration system, such as a blast freezer. Preferably, the refrigeration system cools a compartment to less than about −55° C., preferably less than about −60° C., more preferably to less than about −85° C., or even less than −90° C.

Advantageously, the method further comprises the step of obtaining an allocation of greenhouse gas (e.g. carbon dioxide) emission credit.

In accordance with the retrofitting method described above, an existing heat transfer fluid can be fully removed from the heat transfer device before introducing a composition of the invention. An existing heat transfer fluid can also be partially removed from a heat transfer device, followed by introducing a composition of the invention.

The compositions of the invention may also be prepared simply by mixing the R-1132a, carbon dioxide, R-125 and the fourth component (and further components such as a lubricant, a stabiliser or an additional flame retardant) in the desired proportions. The compositions can then be added to a heat transfer device (or used in any other way as defined herein).

In a further aspect of the invention, there is provided a method for reducing the environmental impact arising from operation of a product comprising an existing compound or composition, the method comprising replacing at least partially the existing compound or composition with a composition of the invention. Preferably, this method comprises the step of obtaining an allocation of greenhouse gas emission credit.

By environmental impact we include the generation and emission of greenhouse warming gases through operation of the product.

As mentioned above, this environmental impact can be considered as including not only those emissions of compounds or compositions having a significant environmental impact from leakage or other losses, but also including the emission of carbon dioxide arising from the energy consumed by the device over its working life. Such environmental impact may be quantified by the measure known as Total Equivalent Warming Impact (TEWI). This measure has been used in quantification of the environmental impact of certain stationary refrigeration and air conditioning equipment, including for example supermarket refrigeration systems (see, for example, http://en.wikipedia.org/wiki/Total_equivalent_warming_impact).

The environmental impact may further be considered as including the emissions of greenhouse gases arising from the synthesis and manufacture of the compounds or compositions. In this case the manufacturing emissions are added to the energy consumption and direct loss effects to yield the measure known as Life-Cycle Carbon Production (LCCP, see for example http://www.sae.org/events/aars/presentations/2007papasavva.pdf). The use of LCCP is common in assessing environmental impact of automotive air conditioning systems.

Emission credit(s) are awarded for reducing pollutant emissions that contribute to global warming and may, for example, be banked, traded or sold. They are conventionally expressed in the equivalent amount of carbon dioxide. Thus if the emission of 1 kg of R-23 is avoided then an emission credit of 1×14800=14800 kg $CO_2$ equivalent may be awarded.

In another embodiment of the invention, there is provided a method for generating greenhouse gas emission credit(s) comprising (i) replacing an existing compound or composition with a composition of the invention, wherein the composition of the invention has a lower GWP than the existing compound or composition; and (ii) obtaining greenhouse gas emission credit for said replacing step.

In a preferred embodiment, the use of the composition of the invention results in the equipment having a lower Total Equivalent Warming Impact, and/or a lower Life-Cycle Carbon Production than that which would be attained by use of the existing compound or composition.

These methods may be carried out on any suitable product, for example in the fields of air-conditioning, refrigeration (e.g. low and medium temperature refrigeration), heat transfer, gaseous dielectrics, flame suppression, solvents (e.g. carriers for flavourings and fragrances), cleaners, topical anaesthetics, and expansion applications. Preferably, the field is ultra-low temperature refrigeration.

Examples of suitable products include heat transfer devices, solvents and mechanical power generation devices. In a preferred embodiment, the product is a heat transfer device, such as a refrigeration device or an ultra-low temperature refrigeration system.

The existing compound or composition has an environmental impact as measured by GWP and/or TEWI and/or LCCP that is higher than the composition of the invention which replaces it. The existing compound or composition may comprise a fluorocarbon compound, such as a perfluoro-, hydrofluoro-, chlorofluoro- or hydrochlorofluorocarbon compound or it may comprise a fluorinated olefin.

Preferably, the existing compound or composition is a heat transfer compound or composition such as a refrigerant. Examples of refrigerants that may be replaced include ULT refrigerants such as R-508A, R-508B, R-23 and R-1361.

Any amount of the existing compound or composition may be replaced so as to reduce the environmental impact. This may depend on the environmental impact of the existing compound or composition being replaced and the environmental impact of the replacement composition of the invention. Preferably, the existing compound or composition in the product is fully replaced by the composition of the invention.

The invention is illustrated by the following non-limiting examples.

EXAMPLES

Compositions of R-1132a, R-744, R-125 and R-23

The performance of quaternary compositions of the invention were modelled and the results are provided in the following Tables. The tables list the GWP, condenser and evaporator glide, capacity and COP relative to R-23, the difference in discharge temperature and condenser pressure, The Tables provide the contents as weight percentages, unless otherwise specified.

The cycle conditions used in the modelling are as Table 1.

TABLE 1

| Cycle conditions for modelling | | |
|---|---|---|
| Reference fluid for cycle calculation is R-23 | | |
| Condensing temperature | ° C. | −20 |
| Evaporating temperature | ° C. | −70 |
| Suction gas temperature | ° C. | −50 |
| Isentropic efficiency | | 0.65 |
| Subcooling | K | 5 |
| Evaporator superheat | K | 5 |
| Cooling duty | kW | 1 |
| Clearance ratio | | 0.03 |
| Suction line diameter for PD calculation | mm | 22 |
| Cycle calculation results | | R-23 reference |
| Pressure ratio | | 7.20 |
| Volumetric efficiency | | 89.3% |
| Condenser glide | K | 0.0 |
| Evaporator glide | K | 0.0 |
| Evaporator inlet temperature | ° C. | −70.0 |
| Condenser exit temperature | ° C. | −25.0 |
| Condenser pressure | bar | 13.95 |
| Evaporator pressure | bar | 1.94 |
| Refrigeration effect | kJ/kg | 174.1 |
| Coefficient of Performance | | 1.90 |
| Discharge temperature | ° C. | 86.4 |
| Mass flow rate | kg/hr | 20.7 |
| Volumetric flow rate | m3/hr | 2.72 |
| Volumetric capacity | kJ/m3 | 1322 |
| Suction line pressure drop | kPa/m | 8.75 |
| Suction line density | kg/m3 | 7.59 |
| Condenser inlet density | kg/m3 | 58.94 |
| Capacity relative to R-23 | | 100.0% |
| COP relative to R-23 | | 100.0% |
| Discharge temperature difference | K | 0.0 |
| Condenser pressure difference | bar | 0.00 |
| Pressure ratio relative to that of R-23 | | 100.0% |

The thermodynamic model used for the mixture calculations uses a cubic equation of state to model the vapour phase, with a Gibbs free energy correlation (the Wilson equation) to model the liquid phase and temperature correlations of the component vapour pressures. The binary interaction parameters for the fluids were correlated to measured phase equilibrium data where available.

Many compositions have been identified that have volumetric capacity significantly higher than that of R-23 and may be better suited to a new system design to take advantage of the fluid properties.

TABLE 2

| | | | | | | | | | |
|---|---|---|---|---|---|---|---|---|---|
| R744 | | 60 | 60 | 55 | 55 | 50 | 50 | 50 | 50 |
| R1132a | | 30 | 25 | 30 | 25 | 40 | 35 | 35 | 30 |
| R-23 | | 5 | 10 | 10 | 10 | 5 | 10 | 5 | 15 |
| R125 | | 5 | 5 | 5 | 10 | 5 | 5 | 10 | 5 |
| Global Warming Potential (AR4 basis) | | 916 | 1656 | 1656 | 1831 | 916 | 1656 | 1091 | 2396 |
| Cycle calculation results | | | | | | | | | |
| Condenser glide | K | 2.5 | 2.4 | 2.6 | 4.3 | 2.9 | 2.7 | 4.7 | 2.6 |
| Evaporator glide | K | 2.8 | 2.8 | 2.8 | 4.8 | 2.9 | 2.8 | 5.1 | 2.7 |

TABLE 2-continued

| | | | | | | | | | |
|---|---|---|---|---|---|---|---|---|---|
| Capacity relative to R-23 | | 126.4% | 124.6% | 123.2% | 115.9% | 122.8% | 121.5% | 115.6% | 120.2% |
| COP relative to R-23 | | 97.2% | 96.1% | 96.5% | 96.4% | 98.0% | 97.0% | 97.8% | 96.0% |
| Discharge temperature difference | K | 18.1 | 21.1 | 17.0 | 18.1 | 10.5 | 13.1 | 11.5 | 15.8 |
| Condenser pressure difference | bar | 3.78 | 3.85 | 3.59 | 2.86 | 3.20 | 3.30 | 2.48 | 3.39 |
| | R744 | 50 | 50 | 50 | 50 | 45 | 45 | 45 | 45 |
| | R1132a | 30 | 25 | 25 | 25 | 40 | 35 | 35 | 35 |
| | R-23 | 10 | 15 | 10 | 5 | 10 | 15 | 10 | 5 |
| | R125 | 10 | 10 | 15 | 20 | 5 | 5 | 10 | 15 |
| Global Warming Potential (AR4 basis) | | 1831 | 2571 | 2006 | 1441 | 1656 | 2396 | 1831 | 1266 |
| Cycle calculation results | | | | | | | | | |
| Condenser glide | K | 4.5 | 4.3 | 6.1 | 7.8 | 2.9 | 2.7 | 4.6 | 6.5 |
| Evaporator glide | K | 4.8 | 4.6 | 6.5 | 8.4 | 2.8 | 2.7 | 4.8 | 6.9 |
| Capacity relative to R-23 | | 114.4% | 113.1% | 108.0% | 103.4% | 119.7% | 118.6% | 112.7% | 107.4% |
| COP relative to R-23 | | 96.9% | 95.9% | 96.9% | 98.1% | 97.4% | 96.5% | 97.4% | 98.4% |
| Discharge temperature difference | K | 14.1 | 16.7 | 14.6 | 12.3 | 9.3 | 11.8 | 10.1 | 8.2 |
| Condenser pressure difference | bar | 2.58 | 2.66 | 1.91 | 1.18 | 2.98 | 3.08 | 2.28 | 1.51 |
| | R744 | 45 | 45 | 45 | 45 | 45 | 45 | 45 | 43 |
| | R1132a | 30 | 30 | 30 | 30 | 25 | 25 | 25 | 35 |
| | R-23 | 15 | 10 | 7 | 5 | 15 | 10 | 5 | 7 |
| | R125 | 10 | 15 | 18 | 20 | 15 | 20 | 25 | 15 |
| Global Warming Potential (AR4 basis) | | 2571 | 2006 | 1667 | 1441 | 2746 | 2181 | 1616 | 1562 |
| Cycle calculation results | | | | | | | | | |
| Condenser glide | K | 4.4 | 6.3 | 7.3 | 8.0 | 6.0 | 7.8 | 9.4 | 6.4 |
| Evaporator glide | K | 4.6 | 6.6 | 7.7 | 8.4 | 6.2 | 8.0 | 9.7 | 6.8 |
| Capacity relative to R-23 | | 111.6% | 106.4% | 103.6% | 101.8% | 105.4% | 100.7% | 96.6% | 106.3% |
| COP relative to R-23 | | 96.5% | 97.4% | 98.1% | 98.6% | 96.5% | 97.6% | 98.9% | 98.2% |
| Discharge temperature difference | K | 12.6 | 10.6 | 9.3 | 8.4 | 13.1 | 10.9 | 8.3 | 7.6 |
| Condenser pressure difference | bar | 2.37 | 1.61 | 1.17 | 0.89 | 1.70 | 0.98 | 0.29 | 1.43 |
| | R744 | 43 | 43 | 43 | 43 | 43 | 40 | 40 | 40 |
| | R1132a | 30 | 30 | 30 | 27 | 25 | 35 | 35 | 35 |
| | R-23 | 10 | 7 | 5 | 8 | 10 | 15 | 10 | 5 |
| | R125 | 17 | 20 | 22 | 22 | 22 | 10 | 15 | 20 |
| Global Warming Potential (AR4 basis) | | 2076 | 1737 | 1511 | 1955 | 2251 | 2571 | 2006 | 1441 |
| Cycle calculation results | | | | | | | | | |
| Condenser glide | K | 6.9 | 8.0 | 8.6 | 8.5 | 8.4 | 4.6 | 6.4 | 8.1 |
| Evaporator glide | K | 7.2 | 8.3 | 9.0 | 8.7 | 8.6 | 4.6 | 6.6 | 8.5 |
| Capacity relative to R-23 | | 103.5% | 100.7% | 99.0% | 98.4% | 98.0% | 110.0% | 104.7% | 99.9% |
| COP relative to R-23 | | 97.7% | 98.4% | 98.9% | 98.3% | 97.9% | 97.0% | 98.0% | 99.1% |
| Discharge temperature difference | K | 9.2 | 7.8 | 6.8 | 8.3 | 9.3 | 8.6 | 6.7 | 4.6 |
| Condenser pressure difference | bar | 1.23 | 0.80 | 0.52 | 0.58 | 0.62 | 2.05 | 1.29 | 0.57 |
| | R744 | 40 | 40 | 40 | 40 | 40 | 35 | 35 | 35 |
| | R1132a | 30 | 30 | 30 | 25 | 25 | 50 | 45 | 40 |
| | R-23 | 20 | 15 | 10 | 15 | 10 | 5 | 5 | 5 |
| | R125 | 10 | 15 | 20 | 20 | 25 | 10 | 15 | 20 |
| Global Warming Potential (AR4 basis) | | 3311 | 2746 | 2181 | 2921 | 2356 | 1091 | 1266 | 1441 |
| Cycle calculation results | | | | | | | | | |
| Condenser glide | K | 4.4 | 6.2 | 7.9 | 7.7 | 9.3 | 5.0 | 6.6 | 8.1 |
| Evaporator glide | K | 4.4 | 6.3 | 8.1 | 7.7 | 9.3 | 5.1 | 6.9 | 8.5 |
| Capacity relative to R-23 | | 109.1% | 103.9% | 99.1% | 98.2% | 93.9% | 109.2% | 103.3% | 97.9% |
| COP relative to R-23 | | 96.2% | 97.1% | 98.2% | 97.3% | 98.5% | 99.2% | 99.3% | 99.6% |
| Discharge temperature difference | K | 10.9 | 9.0 | 6.9 | 9.2 | 6.8 | 0.5 | 0.8 | 0.8 |
| Condenser pressure difference | bar | 2.13 | 1.39 | 0.67 | 0.76 | 0.08 | 1.45 | 0.83 | 0.23 |
| | R744 | 35 | 35 | 35 | 35 | 35 | 35 | 35 | 35 |
| | R1132a | 35 | 45 | 40 | 35 | 30 | 40 | 35 | 30 |
| | R-23 | 5 | 10 | 10 | 10 | 10 | 15 | 15 | 15 |
| | R125 | 25 | 10 | 15 | 20 | 25 | 10 | 15 | 20 |
| Global Warming Potential (AR4 basis) | | 1616 | 1831 | 2006 | 2181 | 2356 | 2571 | 2746 | 2921 |
| Cycle calculation results | | | | | | | | | |
| Condenser glide | K | 9.5 | 4.8 | 6.4 | 7.9 | 9.3 | 4.7 | 6.3 | 7.7 |
| Evaporator glide | K | 9.8 | 4.9 | 6.6 | 8.1 | 9.4 | 4.6 | 6.3 | 7.7 |
| Capacity relative to R-23 | | 92.9% | 108.7% | 102.8% | 97.3% | 92.3% | 108.2% | 102.2% | 96.7% |
| COP relative to R-23 | | 100.0% | 98.4% | 98.5% | 98.8% | 99.1% | 97.6% | 97.8% | 98.0% |

TABLE 2-continued

| | | | | | | | | | |
|---|---|---|---|---|---|---|---|---|---|
| Discharge temperature difference | K | 0.6 | 2.6 | 2.9 | 3.0 | 2.8 | 4.7 | 5.0 | 5.1 |
| Condenser pressure difference | bar | −0.35 | 1.59 | 0.95 | 0.34 | −0.25 | 1.70 | 1.05 | 0.44 |

| | | |
|---|---|---|
| R744 | | 35 |
| R1132a | | 25 |
| R-23 | | 15 |
| R125 | | 25 |
| Global Warming Potential (AR4 basis) | | 3096 |
| Cycle calculation results | | |
| Condenser glide | K | 9.1 |
| Evaporator glide | K | 8.9 |
| Capacity relative to R-23 | | 91.5% |
| COP relative to R-23 | | 98.3% |
| Discharge temperature difference | K | 5.0 |
| Condenser pressure difference | bar | −0.16 |

Compositions of R-1132a, R-744, R-125 and R-116

The performance of quaternary compositions of the invention were modelled and the results are provided in the following Tables. The tables list the GWP, condenser and evaporator glide, capacity and COP relative to R-23, the difference in discharge temperature and condenser pressure, the maximum VDF in vapour and liquid, the molar percentage of R-1132a. The Tables show the contents as weight percentages, unless otherwise specified.

The conditions used are as set out in Table 1.

TABLE 3

| | | | | | | | | | |
|---|---|---|---|---|---|---|---|---|---|
| | R744 | 60 | 50 | 50 | 50 | 50 | 50 | 50 | 50 |
| | R1132a | 30 | 40 | 35 | 30 | 30 | 25 | 25 | 20 |
| | R116 | 5 | 5 | 10 | 15 | 10 | 15 | 10 | 20 |
| | R125 | 5 | 5 | 5 | 5 | 10 | 10 | 15 | 10 |
| Global Warming Potential (AR4 basis) | | 786 | 786 | 1396 | 2006 | 1571 | 2181 | 1746 | 2791 |
| Cycle calculation results | | | | | | | | | |
| Condenser glide | K | 2.9 | 3.2 | 3.3 | 3.3 | 5.2 | 5.3 | 7.1 | 5.3 |
| Evaporator glide | K | 3.3 | 3.4 | 3.7 | 4.0 | 6.2 | 6.6 | 8.3 | 6.9 |
| Capacity relative to R-23 | | 130.8% | 126.7% | 129.3% | 131.9% | 121.5% | 123.9% | 114.8% | 126.1% |
| COP relative to R-23 | | 98.7% | 99.4% | 99.7% | 99.9% | 99.5% | 99.7% | 99.6% | 99.9% |
| Discharge temperature difference | K | 12.9 | 5.6 | 3.3 | 1.0 | 4.4 | 2.1 | 4.9 | −0.2 |
| Condenser pressure difference | bar | 4.05 | 3.42 | 3.77 | 4.13 | 3.03 | 3.37 | 2.34 | 3.71 |
| | R744 | 50 | 50 | 45 | 45 | 45 | 43 | 45 | 45 |
| | R1132a | 20 | 20 | 40 | 35 | 35 | 35 | 35 | 30 |
| | R-23 | 15 | 10 | 10 | 15 | 10 | 7 | 5 | 15 |
| | R125 | 15 | 20 | 5 | 5 | 10 | 15 | 15 | 10 |
| Global Warming Potential (AR4 basis) | | 2356 | 1921 | 1396 | 2006 | 1571 | 1380 | 1136 | 2181 |
| Cycle calculation results | | | | | | | | | |
| Condenser glide | K | 7.2 | 8.8 | 3.4 | 3.5 | 5.4 | 7.1 | 7.0 | 5.5 |
| Evaporator glide | K | 8.7 | 10.0 | 3.8 | 4.0 | 6.2 | 8.0 | 7.8 | 6.6 |
| Capacity relative to R-23 | | 117.0% | 108.9% | 126.8% | 129.4% | 119.3% | 110.5% | 110.5% | 121.5% |
| COP relative to R-23 | | 99.9% | 99.9% | 100.0% | 100.3% | 99.9% | 100.0% | 99.7% | 100.2% |
| Discharge temperature difference | K | 2.6 | 5.1 | −0.2 | −2.5 | 0.8 | 1.2 | 3.5 | −1.5 |
| Condenser pressure difference | bar | 2.66 | 1.69 | 3.40 | 3.75 | 2.68 | 1.68 | 1.70 | 3.01 |
| | R744 | 45 | 45 | 43 | 43 | 43 | 43 | 43 | 43 |
| | R1132a | 30 | 30 | 25 | 25 | 25 | 25 | 25 | 25 |
| | R116 | 10 | 5 | 20 | 18 | 16 | 14 | 12 | 10 |
| | R125 | 15 | 20 | 12 | 14 | 16 | 18 | 20 | 22 |
| Global Warming Potential (AR4 basis) | | 1746 | 1311 | 2861 | 2687 | 2513 | 2339 | 2165 | 1991 |
| Cycle calculation results | | | | | | | | | |
| Condenser glide | K | 7.2 | 8.6 | 6.3 | 7.1 | 7.8 | 8.4 | 9.0 | 9.6 |
| Evaporator glide | K | 8.3 | 9.5 | 7.8 | 8.6 | 9.2 | 9.8 | 10.3 | 10.7 |
| Capacity relative to R-23 | | 112.7% | 104.9% | 119.8% | 116.4% | 113.1% | 110.0% | 106.9% | 104.0% |
| COP relative to R-23 | | 100.1% | 100.0% | 100.6% | 100.6% | 100.7% | 100.7% | 100.8% | 100.8% |
| Discharge temperature difference | K | 1.2 | 3.7 | −5.0 | −3.9 | −2.9 | −2.0 | −1.1 | −0.2 |
| Condenser pressure difference | bar | 2.00 | 1.07 | 2.89 | 2.48 | 2.09 | 1.71 | 1.33 | 0.97 |

TABLE 3-continued

|  |  |  |  |  |  |  |  |  |  |
|---|---|---|---|---|---|---|---|---|---|
|  | R744 | 40 | 40 | 40 | 40 | 40 | 40 | 35 | 35 |
|  | R1132a | 35 | 35 | 35 | 30 | 30 | 30 | 50 | 45 |
|  | R-23 | 15 | 10 | 5 | 20 | 15 | 10 | 5 | 5 |
|  | R125 | 10 | 15 | 20 | 10 | 15 | 20 | 10 | 15 |
| Global Warming Potential (AR4 basis) |  | 2181 | 1746 | 1311 | 2791 | 2356 | 1921 | 961 | 1136 |
| Cycle calculation results |  |  |  |  |  |  |  |  |  |
| Condenser glide | K | 5.6 | 7.3 | 8.7 | 5.6 | 7.4 | 9.0 | 5.4 | 7.1 |
| Evaporator glide | K | 6.6 | 8.3 | 9.5 | 6.9 | 8.7 | 10.1 | 5.8 | 7.7 |
| Capacity relative to R-23 |  | 119.0% | 110.4% | 102.8% | 121.1% | 112.5% | 104.8% | 111.7% | 105.8% |
| COP relative to R-23 |  | 100.6% | 100.5% | 100.5% | 100.8% | 100.8% | 100.9% | 100.3% | 100.5% |
| Discharge temperature difference | K | −5.0 | −2.3 | 0.0 | −7.3 | −4.6 | −2.3 | −3.8 | −3.5 |
| Condenser pressure difference | bar | 2.61 | 1.64 | 0.73 | 2.93 | 1.93 | 1.01 | 1.60 | 0.97 |
|  | R744 | 35 | 35 | 35 | 35 | 35 | 35 | 35 | 35 |
|  | R1132a | 40 | 35 | 45 | 40 | 35 | 30 | 40 | 35 |
|  | R116 | 5 | 5 | 10 | 10 | 10 | 10 | 15 | 15 |
|  | R125 | 20 | 25 | 10 | 15 | 20 | 25 | 10 | 15 |
| Global Warming Potential (AR4 basis) |  | 1311 | 1486 | 1571 | 1746 | 1921 | 2096 | 2181 | 2356 |
| Cycle calculation results |  |  |  |  |  |  |  |  |  |
| Condenser glide | K | 8.7 | 10.2 | 5.6 | 7.3 | 9.0 | 10.6 | 5.7 | 7.5 |
| Evaporator glide | K | 9.4 | 10.9 | 6.2 | 8.2 | 10.0 | 11.6 | 6.5 | 8.7 |
| Capacity relative to R-23 |  | 100.4% | 95.5% | 113.9% | 107.8% | 102.3% | 97.4% | 116.1% | 109.8% |
| COP relative to R-23 |  | 100.9% | 101.4% | 100.7% | 100.9% | 101.4% | 102.0% | 101.0% | 101.3% |
| Discharge temperature difference | K | −3.6 | −3.9 | −6.1 | −5.8 | −5.9 | −6.2 | −8.4 | −8.1 |
| Condenser pressure difference | bar | 0.36 | −0.22 | 1.89 | 1.24 | 0.63 | 0.04 | 2.19 | 1.52 |
|  | R744 |  |  |  |  |  |  | 35 | 35 |
|  | R1132a |  |  |  |  |  |  | 30 | 25 |
|  | R116 |  |  |  |  |  |  | 15 | 15 |
|  | R125 |  |  |  |  |  |  | 20 | 25 |
| Global Warming Potential (AR4 basis) |  |  |  |  |  |  |  | 2531 | 2706 |
| Cycle calculation results |  |  |  |  |  |  |  |  |  |
| Condenser glide | K |  |  |  |  |  |  | 9.2 | 10.9 |
| Evaporator glide | K |  |  |  |  |  |  | 10.5 | 12.2 |
| Capacity relative to R-23 |  |  |  |  |  |  |  | 104.2% | 99.1% |
| COP relative to R-23 |  |  |  |  |  |  |  | 101.8% | 102.4% |
| Discharge temperature difference | K |  |  |  |  |  |  | −8.3 | −8.6 |
| Condenser pressure difference | bar |  |  |  |  |  |  | 0.89 | 0.28 |

In summary, the compositions of the invention exhibit an unexpected combination of advantageous properties such as (i) low- or non-flammability, (ii) low GWP compared to existing ultra-low temperature refrigerants (e.g. R-23) and (iii) comparable or improved refrigeration performance at suitable operating temperatures and pressures compared to existing ultra-low temperature refrigerants (e.g. R-23) in terms of, for example, low glide and/or cooling capacity and/or energy efficiency.

Preferences and options for a given aspect, feature or parameter of the invention should, unless the context indicates otherwise, be regarded as having been disclosed in combination with any and all preferences and options for all other aspects, features and parameters of the invention.

The invention is defined by the following claims.

What is claimed is:

1. A composition, comprising:
   (i) 1,1-difluoroethene (vinylidene fluoride, R-1132a);
   (ii) carbon dioxide ($CO_2$, R-744);
   (iii) from about 5 to 25% by weight pentafluoroethane (R-125); and
   (iv) trifluoromethane (R-23).

2. The composition according to claim 1, comprising from 1 to 90% by weight R-1132a.

3. The composition according to claim 1, comprising from 1 to 90% by weight carbon dioxide.

4. The composition according to claim 1, comprising from 1 to 90% by weight of trifluoromethane.

5. The composition according to claim 1, comprising from 20 to 40% by weight R-1132a, from 30 to 60% by weight carbon dioxide, and from 1 to 20% by weight R-23.

6. The composition according to claim 1, wherein the R-1132a is present in an amount of less than 50% by mol.

7. The composition according to claim 1, consisting essentially of:
   (i) 1,1-difluoroethene (vinylidene fluoride, R-1132a);
   (ii) carbon dioxide ($CO_2$, R-744);
   (iii) from about 5 to 25% by weight pentafluoroethane (R-125); and
   (iv) trifluoromethane (R-23).

8. The composition according to claim 1, which is azeotropic or near-azeotropic.

9. The composition according to claim 1, wherein the composition
   (i) is less flammable;
   (ii) has a higher flammable limit;
   (iii) has a higher ignition energy; and/or
   (iv) has a lower flame velocity compared to R-1132a alone.

10. The composition according to claim 1, which is non-flammable.

11. The composition according to claim 1, which has a temperature glide in an evaporator or condenser of less than about 10 K.

12. The composition according to claim 1, which has a critical temperature of greater than about 0° C.

13. The composition according to claim 1, which has a volumetric refrigeration capacity of at least 90% of that of R-23 at comparable cycle conditions.

14. The composition according to claim 1, which has a cycle efficiency (Coefficient of Performance, COP) of at least 95% and/or within about 5% of a cycle efficiency of the existing refrigerant fluid that the composition is replacing.

15. The composition according to claim 1, which has a compressor discharge temperature within 15 K of that of R-23 at comparable cycle conditions.

16. A composition, comprising a lubricant, a stabilizer, and/or a flame retardant and the composition according to claim 1.

17. The composition according to claim 16, wherein the lubricant is selected from the group consisting of mineral oil, silicone oil, polyalkyl benzenes (PABs), polyol esters (POEs), polyalkylene glycols (PAGs), polyalkylene glycol esters (PAG esters), polyvinyl ethers (PVEs), poly (alpha-olefins), and combinations thereof;
wherein the stabilizer is selected from the group consisting of diene-based compounds, phosphates, phenol compounds, epoxides, and mixtures thereof; and
wherein the flame retardant is selected from the group consisting of tri-(2-chloroethyl)-phosphate, (chloropropyl)-phosphate, tri-(2,3-dibromopropyl)-phosphate, tri-(1,3-chloropropyl)-phosphate, diammonium phosphate, various halogenated aromatic compounds, antimony oxide, aluminum trihydrate, polyvinyl chloride, a fluorinated iodocarbon, a fluorinated bromocarbon, trifluoroiodomethane, perfluoroalkyl amines, bromo-fluoroalkyl amines, and mixtures thereof.

18. The composition according to claim 17, wherein the composition comprises a lubricant and pentane.

19. The composition according to claim 1, further comprising hexafluoroethane (R-116).

20. A heat transfer device, comprising the composition according to claim 1.

21. The heat transfer device according to claim 20, wherein the heat transfer device is a refrigeration device.

22. The heat transfer device according to claim 20, wherein the heat transfer device comprises an ultra-low temperature refrigeration system and/or a cascade system.

23. A method for cooling an article, the method comprising condensing the composition according to claim 1; and thereafter evaporating the composition in the vicinity of the article to be cooled.

24. A method for heating an article, the method comprising condensing the composition according to claim 1 in the vicinity of the article to be heated; and thereafter evaporating the composition.

25. A method of retrofitting a heat transfer device, comprising removing an existing heat transfer composition, and introducing the composition according to claim 1.

26. The method according to claim 25, wherein the heat transfer device is a refrigeration device.

27. The method according to claim 26, wherein the existing heat transfer composition is a refrigerant selected from the group consisting of R-508A, R-508B, R-23, and R-13B1.

28. A method for reducing an environmental impact arising from an operation of a product comprising an existing compound or composition, the method comprising replacing at least partially the existing compound or composition with the composition according to claim 1.

29. The method according to claim 28, wherein the existing compound or composition is a refrigerant selected from the group consisting of R-508A, R508B, R-23, and R-13B1.

* * * * *